July 25, 1967  K. E. KRYLOW ETAL  3,332,825
TWISTOR ENCAPSULATOR MACHINE
Filed June 5, 1964  2 Sheets-Sheet 1
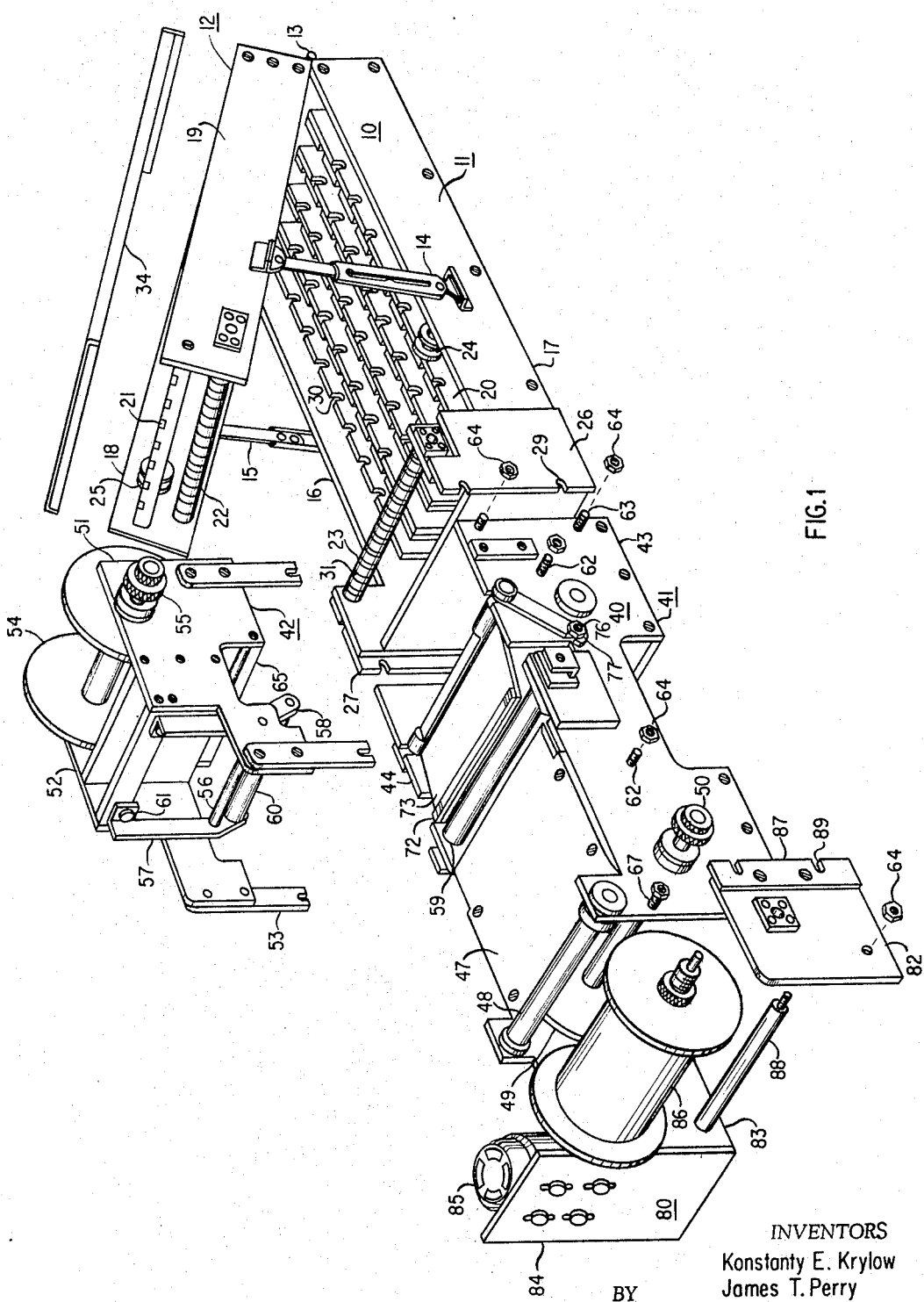
FIG.1
INVENTORS
Konstanty E. Krylow
James T. Perry
William A. Reimer
BY 
ATTY.

July 25, 1967     K. E. KRYLOW ETAL     3,332,825
TWISTOR ENCAPSULATOR MACHINE

Filed June 5, 1964     2 Sheets-Sheet 2

3,332,825
TWISTOR ENCAPSULATOR MACHINE
Konstanty E. Krylow, Chicago, James T. Perry, Glen Ellyn, and William A. Reimer, Villa Park, Ill., assignors to Automatic Electric Laboratories, Inc., Northlake, Ill., a corporation of Delaware
Filed June 5, 1964, Ser. No. 372,937
5 Claims. (Cl. 156—436)

ABSTRACT OF THE DISCLOSURE

A machine for laminating a plurality of specifically spaced wires between a pair of flat thermosetting tapes each having a thermoplastic coating on their confronting surfaces. The tapes are fed from a pair of tensioned tape supply spools between a pair of heatable laminating rollers. The wires are fed from a plurality of rotatably mounted wire supply spools over a wire guide, which is adjustable according to height to direct and maintain the wires at the point of tangency with the tapes in spaced relationship between the tapes as they are advanced through the laminating rollers. The laminate is taken up on a motor driven takeup spool, which pulls it through the laminating rollers. Heating elements in the laminating rollers heat the rollers to heat the tapes to above the melting point of the thermoplastic coatings, whereby the wires are embedded therein and the tapes are fused together simultaneously as the tapes and wires are moved between the rollers. The completed lamination is moved over a metal plate which dissipates the heat contained therein before it is stored on the takeup spool to prevent curl of the completed lamination.

---

This invention relates to encapsulator machines and more particularly it relates to improvements in the construction of these machines.

The above machines are used for encapsulating small wires such as twistor wire or solenoid wire used in twistor memories. An article entitled "The Twistor," appearing in the January 1960 issue of "The Western Electric Engineer", describes the characteristics of twistor wire and explains the nature of the wire after being encapsulated between the thermoplastic coatings of the corresponding two ribbons, or sheets, of thermosetting tape to form what is known in the art as twistor tape. Copending application Ser. No. 194,246, W. A. Reimer, filed May 14, 1962, now Patent No. 3,139,668, rescribes a twistor memory system which utilizes the twistor tape.

Twistor wire or solenoid wire due to its finite size is subject to being broken with the slightest variation in tension. Variation in the spacing between adjacent wires, on the other hand, tends to adversely affect the electrical and magnetic characteristics of memory system in which the wires serve as the basic element. Thus it is necessary for an encapsulator machine to be able to control spacing of the wires, provide sufficient tension to the wires and insure that the tape and wires advance smoothly through the encapsulating machine.

Heretofore, encapsulator machines have been relatively complicated in construction and accordingly costly. For example, the encapsulator machine disclosed in the July 1962 issue of the publication The Western Electric Engineer, tensioning of the individual wires is made by use of a separate torque motor for each wire spool. This arrangement performs satisfactorily, however it adds substantially to the cost and size of the machine. It also results in longer lengths of unsupported wire which calls for additional wire guides or guide rollers.

Laminating the small wires between the tapes is done by heating the tapes to a point above the melting point of the thermoplastic coatings and applying pressure to simultaneously embed the wires within the coatings and fuse the tapes together. After the lamination takes place it is desirable to dissipate the heat therein as rapidly as possible so that the coating does not set after the completed lamination is wound on the takeup spool. Setting after the lamination is wound up will cause what is known as curl in the finished product. A curl makes the tape very difficult to handle during the assembly of the memory system.

An object of the present invention is to improve the overall construction of encapsulator machines and reduce the cost of manufacture.

Another object of the invention is to provide an encapsulator machine with an improved wire supply section that can be easily loaded and unloaded and that avoids the use of special power driven tensioning means.

Still another object of the invention is to simplify the arrangement of the wire guides and rollers used in an encapsulator machine.

Still another object of the invention is to provide a laminating means whereby the time lapse between heating and cooling of the plastic coated tapes is minimized.

The invention is embodied in an encapsulator machine consisting of three separate sections; a wire supply section, a laminating section and a takeup spool section. These sections are joined and locked together by an arrangement of slide guide bars, bolts and nuts which accommodate each other.

The wire supply section consists of an upper and lower portion hinged at one end so that the opposite end can be opened to facilitate the loading of the wire spools. Each includes a number of brass bars for supporting axles of the wire spools. The bars are laid out in adjacent pairs so that the wire spools lie in a plane instead of in a single row. This arrangement shortens the distance from the spools to the laminating section and thereby shortens the length of unsupported wire. It also eliminates the need for the wires to diverge from the spools to the laminating section.

The laminating section consists also of an upper and lower portion and lies between the takeup spool section and the wire supply section. More particularly the section features a pair of spools for carrying the sheets or tapes, a single pair of laminating rollers, a main wire guide assembly, consisting of a wire guide strip, a fin, and height adjuster member for adjusting the height of the wires in close proximity to the point of tangency between the laminating rollers, and means for rapidly dissipating the heat from the tapes after being laminated. The wire guide strip is located as close to the laminating rollers as possible in order to reduce the possibility that the spacing between wires will change after the wires leave the strip and before they are encapsulated.

The takeup spool section features a spool frictionally driven (not shown) by a small electrical motor for collectively advancing the tape and wires and winding the finished product. This spool includes one flange which is adjustable to accommodate various width tapes.

The encapsulator machine disclosed is designed for table mounting and, therefore, the overall size is relatively small. The major portions of the frame structure are made of aluminum with the cross supports made of brass. The rollers employed to carry the tapes are made of brass and rotate on chrome plated stainless steel axles. The wire guide strip and wire guide rollers, on the other hand, are chrome plated to insure that the wires pass smoothly over the guides and rust accumulation is avoided.

These and other objects and features will become more apparent from a perusal of the following detailed description taken in conjunction with the drawings of which:

FIG. 1 is a perspective view of an encapsulator machine according to the preferred embodiment of the invention.

Figure 2:
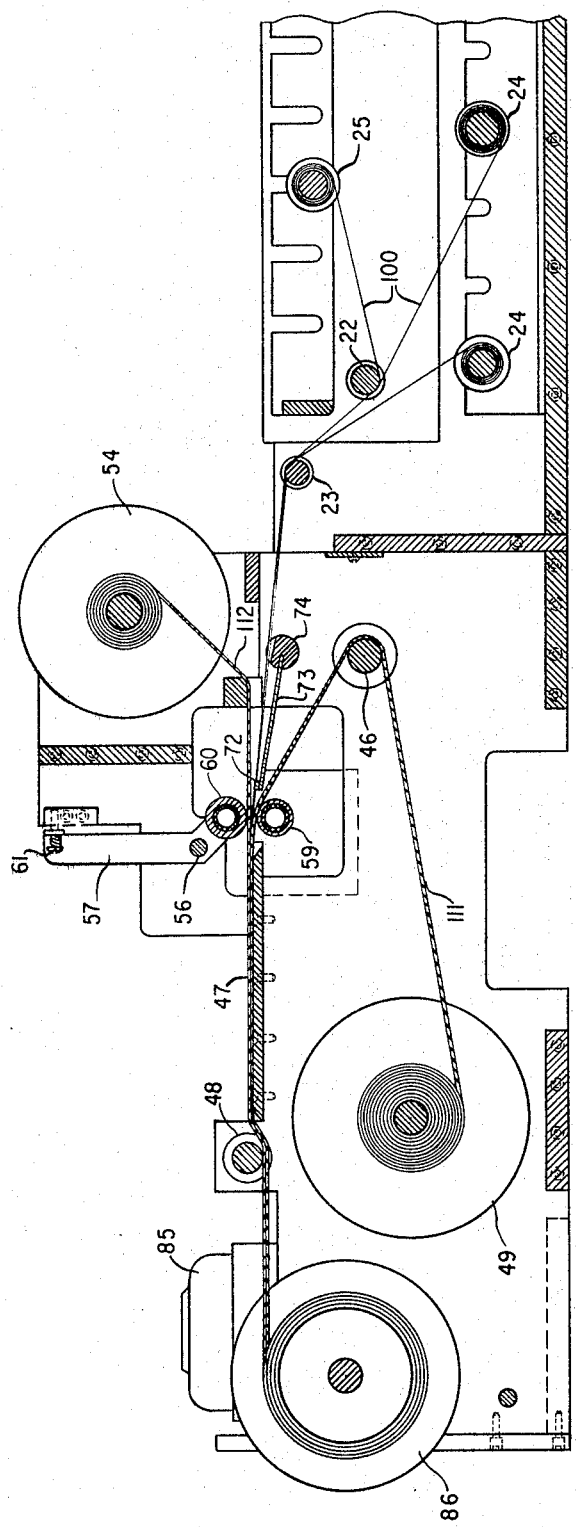
FIG. 2 is a cross sectional view of the encapsulator machine shown in FIG. 1 with the wires and tapes being fed therethrough.

Referring now to the drawings, FIG. 1 shows wire supply section 10, laminating section 40, and takeup spool section 80.

Sections 10 and 40 each have an upper portion and a lower portion in order that the machine can be easily loaded and threaded. With respect to these sections it should be recognized that the frame structure associated with each section is preferably made of aluminum to reduce the weight of the machine. In addition, these sections, particularly the walls thereof line up with each other so that they can be joined together. The means for implementing the connection is the combination of studs 63, and plates 26 and 87 with their corresponding slots 29 and 89. The studs 63 are located so they project through slots 27 and 89 and receive nuts 64 which upon being tightened down secure the connection. By virtue of the machine being constructed in three sections it can be easily worked on and moved from place to place if desired.

Lower portion 11 and upper portion 12 of section 10 are connected at one end by means of hinge 13 while being free to open at the other end. Brackets 14 and 15 are included as the means to keep the portions in open position and are connected to walls 17 and 19 and 16 and 18 respectively. Also connected to these walls are guide rollers 22 and 23, bars 20 and 21 and plates 26 and 87. Lying on the upper portion 12 is a dust cover 34. The guide roller 22 is mounted on an axle (not shown) extending between walls 18 and 19, and guide roller 23 is mounted on an axle extending between walls 16 and 17. These rollers have specifically spaced grooves formed in their circumferences for receiving the wires and are preferably chrome plated to prevent a rust accumulation.

Bars 20 and 21 are laid out in two parallel planes. Furthermore, they are arranged in pairs adjacent each other and have slots, such as 30, for receiving the axles of wire spools 24 and 25 respectively. The slots in one pair of bars are staggered with respect to the slots in an adjacent pair to provide an end thrust bearing for the axle and, thereby, provide stability to their rotation.

The angle at which the wires feed from each spool, the weight of the spool, and the function of the axle with the bars is such to induce proper tension on the wires. Also, because the spools are laid out over a relatively wide area, the spools in each portion can feed without the wires having to converge or diverge toward the first guide roller 22 and 23.

Loading of the wire supply section takes place by merely placing the axles of wire spools 24 and 25 in a selected pair of slots 30. The two portions 11 and 12 can be loaded fast and without first disassembling any spool mounting fixtures.

Encapsulating section 40 includes the aforementioned upper and lower portions 42 and 41 which can be separated by the removal of the upper portion. This greatly facilitates the loading of spools 49 and 54 which carry the tapes or sheets. Lower portion 41 includes walls 43 and 44, wire guide assembly (see FIG. 3), dissipator plate 47, guide spool 48, lower tape spool 49, roller 46 (see FIG. 2), spool tensioning means 50, and laminating roller 59.

The wire guide assembly explained later on in detail in connection with FIG. 3 guides the wires and makes it possible to control the spacing of the individual wires until they are virtually embedded in the plastic coating of the tape. Dissipator plate 47 serves as a heat sink to the heated tape and is directly connected to the walls of the section to provide greater area in which the heat can be dissipated. Guide spool 48 is located at the end of the plate 47 and positioned such that the tape after it is laminated is in complete contact therewith for cooling the lamination. The guide spool 48 rotates also on an axle (not shown). It preferably includes a fixed flange and an adjustable flange to accommodate tapes of various widths and better control the movement thereof. Lower tape spool 49 is rotatably mounted on an axle (also not shown) and rotates in response to the driving of spool 86. To control the tension of tape spool 49, a tensioning means 50 is incorporated into the construction. It can be any commercially available type tensioner.

Laminating roller 59 includes a hollow portion and is mounted on an axle extending between the walls of the section. Its peripheral edge is in line with the top surface of heat dissipator plate 47. Located inside the hollow portion is a resistance wound heater element which heats the roller to a temperature sufficient to melt the plastic coating of the tape 111 as it passes thereover.

Upper portion 42 include walls 51 and 52 which are aligned with walls 43 and 44 and connected to the lower portion by means of guide bars 53, studs 62, and nuts 64 which complement each other to lock the two portions together. In addition this portion includes tape spool 54, spool tensioning means 55 and laminating roller 60.

Tape spool 54 is identical or similar to tape spool 49 and is rotatably mounted on an axle extending between the walls 51 and 52. Its tension is adjusted by means of spool tensioning means 55 which is similar to tensioning means 50. Support arms 57 and 58 are connected to a crossmember of the portion 42 and support laminating roller 60. To allow for adjustment of the roller 60 either toward or away from row 59, adjustable spring tensioners 61 are used. The latter can be of any commercially available type.

Laminating roller 60 has a hollow portion similar to the hollow portion in roller 59 which also contains a resistance wound heater element to heat the roller in order to melt the plastic coating of tape 112 as it passes thereover. Thus, both laminating rollers are heated and the two tapes enter between them concurrently. It should be further understood that both of the laminating rollers are thermally insulated from the walls to concentrate the heat produced by the heaters to the rollers and prevent its escape to the walls of the machine. This results in a reduction in the time lapse between heating the tape and cooling it.

The windup spool section 80 of which spool 86 is a principal part takes up the completed lamination and includes in addition to the spool, walls 82 and 83, motor mount 84, motor 85, securement plate 87 and cross member 88.

The winding or takeup spool 86 preferably includes a fixed flange and an adjustable flange to accommodate the various width tapes. The spool is fixedly mounted on an axle which extends between walls 82 and 83 and is driven by means of a small motor 85. To give the section rigidity cross bar 88 and motor mount 84 are included in the section construction.

FIG. 2 illustrates the laminating process which begins with the tape and wire spools and ends with the takeup spool. It should be kept in mind that when encapsulating "twistor" wire the wires are arranged in pairs located approximately 0.125–0.150 inch apart and that to laminate the wires within the thermoplastic plastic coating the tape must be raised to a temperature of approximately 350° F.

To illustrate the process, roller 49 caries tape 111, roller 54 carries tape 112 and spools 24 and 25 carry the wires 100. The wires are fed from the spools 24 and 25 and advanced toward wire guide rollers 22 and 23. These guide rollers serve to properly space the wires prior to being fed into grooves formed in the top surface of wire guide strip 72. After passing over the wire guide strip the wires advance concurrently between tapes 111 and 112 as they are fed between laminating rollers 59 and 60.

The tapes 111 and 112 move from spools 49 and 54, over guide roller 46 and tape guide 65 and between laminating rollers 59 and 60, respectively.

At the moment the tapes engage the laminating rollers 59 and 60, the temperatures of the tapes are raised to where the thermoplastic coatings thereon reach a pliable state, whereby the wires are embedded therein to form a completed lamination.

Upon leaving the rollers 59 and 60, the completed lamination passes first over heat dissipator plate 47, under tape guide 48, and onto the takeup spool 86. By virtue of the heat dissipator plate 47, the lamination is cooled to below the cure state of the thermoplastic coating before it is wound up and the formation of what is known in the industry as curl is avoided.

The amount of material passing through the machine at any one time is kept at a minimum by virtue of the supply locations being close to the laminating rollers. Furthermore, there are no abrupt corners to hinder an efficient operation and a smooth flow of the material.

Figure 3:
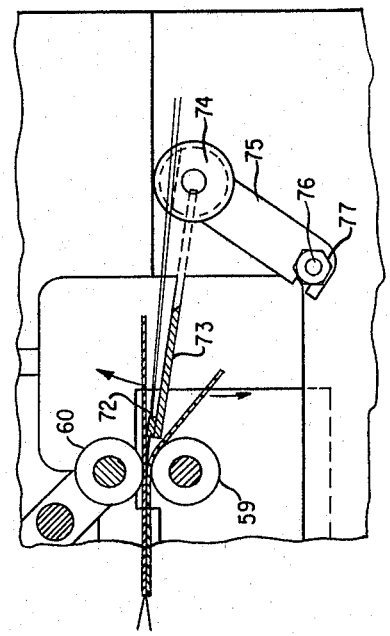
FIG. 3 is an enlarged view of the wire guide assembly and the two laminating rollers.

FIG. 3 shows the laminating section in detail and more particularly the relationship of the main wire guide assembly and the laminating rollers 59 and 60. Since it is desirable to have the wire guide strip 72 located as close as possible to the rollers it is positioned at the end of a relatively thin fin 73. The fin in turn is carried by height adjuster member 74 which by means of its particular mounting on the laminating section is adjustable. It includes in addition to the height adjuster member 74, bracket 75, stud 76 and nut 77, which all complement each other, so that height adjustment can be made by merely loosening the nut and then retightening it against bracket 75.

The wire guide strip 72 is mounted on the fin 73 by means of screws and can thus be easily removed and replaced with a strip having grooves formed thereon corresponding to different spacing distances. A user of the machine therefore need only stock a number of these strips to have substantial flexibility in the use of it.

The invention has been described in detail in connection with a preferred embodiment, however, it is to be understood that this was done merely by way of example and not as a limitation to the spirit and scope of the invention as defined only by the appended claims.

What is claimed is:

1. A machine for laminating a plurality of spaced wires between a pair of flat thermosetting tapes, each having a thermoplastic coating on confronting surfaces comprising, in combination; a main frame including an upper and a lower portion; a pair of tape supply spools, one rotatably mounted in said upper portion and the other rotatably mounted in said lower portion of said main frame; a supply frame attached to one end of said lower portion of said main frame; a plurality of wire supply spools rotatably mounted within said supply frame; a pair of adjacently positioned laminating rollers, one rotatably mounted in said upper portion of said main frame and the other rotatably mounted in said lower portion; a takeup frame attached to the other end of said lower portion of said main frame; a takeup spool rotatably mounted in said takeup frame and having said pair of tapes and said wires attached thereto; means for driving said takeup spool to advance said pair of tapes and said plurality of wires from their respective supply spools between said laminating rollers and onto said takeup spool; wire guiding means mounted in said lower portion of said main frame at a point between said laminating rollers and said supply frame for spacing said wires from each other and directing said wires to their points of tangency with said tapes at their point of entry between said laminating rollers; means for adjusting the height of said wire guiding means and positioning same into close proximity to said point of tangency to maintain said spaced relationship of said wires in the lamination; each of said laminating rollers having a heater element disposed therein for heating said rollers to heat said tapes to above the melting point of said thermoplastic coatings, whereby said plurality of wires are embedded therein and said tapes are fused together simultaneously as said tapes and said wires are advanced between said rollers; and means mounted on said main frame between said takeup spool and said laminating rollers for quickly dissipating the heat in the completed lamination before storage thereof on said takeup spool to minimize curl of the completed lamination.

2. A machine in accordance with claim 1, wherein said wire guiding means comprises a fin shaped member connected to said height adjusting means, and a wire guide strip mounted on the upper leading edge of said fin shaped member; the upper side of said wire guide strip having a plurality of spaced grooves formed therein for receiving and directing individual wires from said supply spools to said point of tangency.

3. A machine in accordance with claim 1, further including a plurality of bars for supporting said plurality of wire supply spools within said supply frame; said wire supply spools each including an axle; said bars mounted in said supply frame perpendicular to the rotational axes of said laminating rollers and arranged in two aligned planes for reducing the length of unsupported wire between said wire spools and said laminating rollers; said bars having slots for receiving said spool axles and arranged in pairs adjacent each other; said slots in one pair of bars staggered with respect to the position of said slots in adjacent pairs, whereby adjacent bars serve as end thrust bearings to said spool axles.

4. A machine in accordance with claim 1, wherein said heat dissipating means comprises a plate of heat conducting material secured to said main frame; and means for maintaining said completed lamination in direct contact with said plate during travel thereover, the heat induced in said completed lamination being dissipated through said plate and said frame structure.

5. A machine in accordance with claim 1, including individual tensioning means for each of said tape supply spools for maintaining a desired tension on said tapes during their advance toward said laminating rollers.

References Cited
UNITED STATES PATENTS

| | | | |
|---|---|---|---|
| 2,983,306 | 5/1961 | Resnick | 156—436 XR |
| 3,068,135 | 12/1962 | Bower | 156—179 |
| 3,082,292 | 3/1963 | Gore | 174—117 |
| 3,168,617 | 2/1965 | Richter | 174—117 |
| 3,239,396 | 3/1966 | Bohannon | 156—52 |

EARL M. BERGERT, *Primary Examiner.*

M. L. KATZ, *Examiner.*